June 22, 1965     J. E. PRICE     3,191,151
PROGRAMMABLE CIRCUIT
Filed Nov. 26, 1962     2 Sheets-Sheet 1
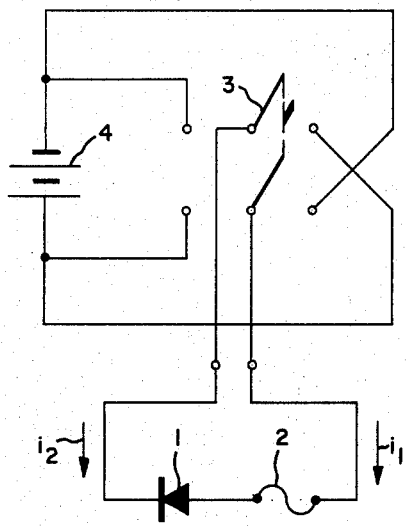
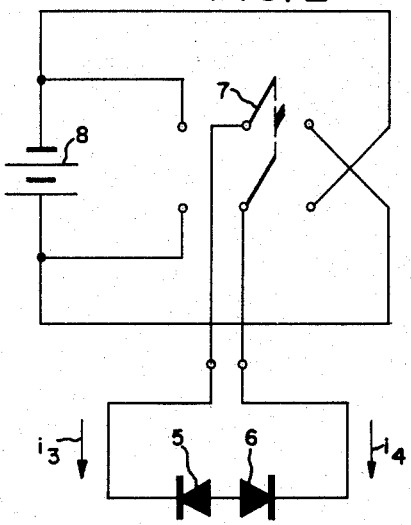
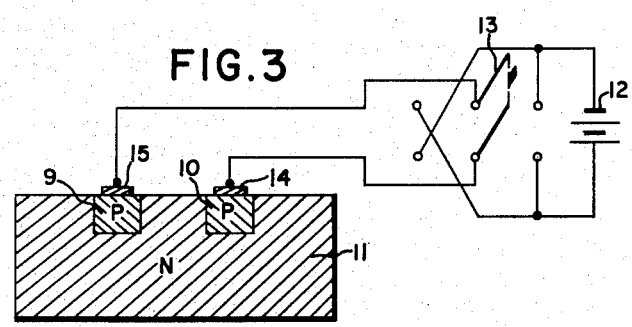
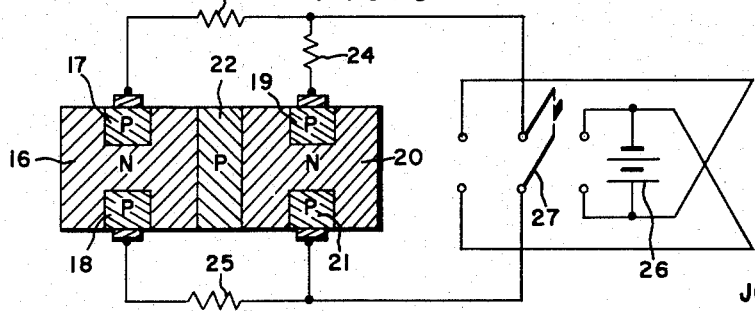
INVENTOR.
JOHN E. PRICE
BY
*Lippincott, Rallo & Hendricson*
ATTORNEYS

INVENTOR.
JOHN E. PRICE
BY
ATTORNEYS

United States Patent Office 3,191,151
Patented June 22, 1965

3,191,151
PROGRAMMABLE CIRCUIT
John E. Price, San Francisco, Calif., assignor to Fairchild
Camera and Instrument Corporation, Syosset, Long
Island, N.Y., a corporation of Delaware
Filed Nov. 26, 1962, Ser. No. 240,010
14 Claims. (Cl. 340—166)

This invention is a programmable diode array circuit. The circuits of the invention generally have one or a series of diodes connected in such a way that the initial circuit pattern may be permanently altered by sending a pulse or a series of pulses into the circuit.

In missiles, it is often necessary to have prefabricated electronic circuits which may be quickly modified. A memory circuit used to direct the missile to its target is one example. The prefabricated memory circuits are installed in the missile; at the time when the location of the missile and the location of the target have been finally determined, the memory circuit is programmed. With the circuits of this invention, a series of pulses from a computer rearranges the circuit to aim the missile correctly. Additionally, programmable error circuits can be retained in the missile. Should a deviation from the proper target direction be detected in flight, radioed pulses could change the memory circuit to adjust the missile's course.

The circuits of this invention are also applicable to computers. Such a computer would have a standard programmable circuit. When installed, its circuitry could be modified for the particular needs of the installation by a series of pulses sent to it. With the great reductions now being made in the cost of integrated circuitry, replaceable circuits of this nature may soon become extremely practical and useful. They would permit computers literally to build themselves.

In its essentials, the diode array circuits of this invention have a semiconductor diode having two regions of the opposite conductivity types connected in series with another circuit element. This second circuit element is usually a fuse, or a second semiconductor diode having two regions of opposite conductivity types. One region of this second diode is connected to the region of the same conductivity type of the first diode (back-to-back). When a current pulse of the proper magnitude and direction is sent into the circuit, the second circuit element is destroyed without affecting the first diode. In the case of a fuse, the pulse is sufficiently large to destroy the fuse, but not large enough to affect the diode. In the case of back-to-back diodes, the pulse is a current pulse of the polarity which is in the forward direction with respect to the required diode and in the reverse direction with respect to the diode to be destroyed. The magnitude of the pulse is sufficient to destroy the junction of the back-biased diode, effectively converting that diode to a short circuit.

When a fuse is destroyed, the conductivity state of the series circuit is changed from the unidirectional conducting state to the non-conducting state of conductivity by the pulse. When the junction of one of two back-to-back diodes is destroyed, the state of conductivity of the circuit is changed from non-conducting state to the unidirectional conducting state in the forward direction of the remaining diode. If two pulses of opposite polarity are sent into the circuit, it is switched from a non-conducting state to a conducting state.

Back-to-back diodes are particularly advantageous. The junction may be reliably destroyed at known current levels. The problem encountered with fuses—failure to burn out when desired—is not nearly as prevalent in diodes.

It will be apparent from the following more detailed description and drawings that very complex diode array circuits may be made using the principles of this invention. In the drawings:

FIG. 1 is a schematic circuit diagram showing one embodiment of the invention;

FIG. 2 is a schematic circuit diagram showing another embodiment of the invention;

FIG. 3 is a somewhat schematic, greatly enlarged, illustration of a diode of the invention connected in a circuit;

FIG. 4 is a schematic diagram of the circuit of FIG. 3 after the junction of one diode has been destroyed;

FIG. 5 is a somewhat schematic, greatly enlarged, illustration of a more complex embodiment of the invention;

Figure 6:
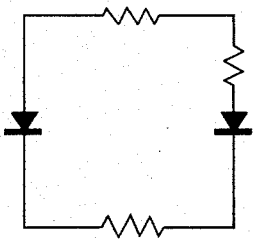
FIG. 6 is a schematic circuit diagram of the device of FIG. 5 after the junctions of one pair of diodes have been destroyed.

Referring now to FIG. 1, a diode 1 is connected in series with a fuse 2. Initially, this circuit is substantially conductive to forward current $i_1$ (with respect to diode 1). It is substantially non-conductive to reverse current $i_2$ (with respect to diode 1). As soon as $i_1$ reaches the value required to burn out fuse 2, the circuit becomes an open circuit. On the other hand, if current $i_2$ is sufficiently large to destroy the junction of diode 1 but not fuse 2, a short circuit is left. Should $i_2$ or $i_1$ subsequently become of sufficient value to burn out fuse 2, the conductivity state is again changed, to an open circuit.

The amount of current required to destroy the fuse can be varied by the fuse construction from a fraction of a milliampere to many amperes. The current $i_1$ or $i_2$ is applied by DPDT switch 3 connected to battery 4. If the switch is closed to the left (as illustrated), current $i_1$ flows; if switch 3 is closed to the right, current $i_2$ flows in the opposite direction.

A preferred embodiment of the invention is shown in FIG. 2. With this embodiment, it is possible to determine the direction of current flow through a circuit after the circuit has been constructed and installed. A circuitous path may be constructed merely by application of a series of electric pulses. Furthermore, the reliability is enhanced over the fused circuits because fuses occasionally fail to burn out when they should.

Referring to FIG. 2, diodes 5 and 6 are connected back-to-back as shown. Initially, this circuit is substantially non-conductive across the diodes. However, if a sufficient current $i_3$ is passed through the junction of diode 5, the punction is destroyed, leaving an effective short circuit in its place. With conventional solid-state devices, the resistance of the destroyed diode 5 can be reduced to about 1 ohm. Since the forward resistance of the diodes themselves is generally about 10 ohms, the remaining small resistance of diode 5 after the junction has been destroyed can be neglected in comparison with the normal forward resistance of the remaining diode 6. After a pulse of current $i_3$ sufficient to destroy the junction of diode 5 has been sent into the circuit, the circuit becomes effectively diode 6. If desired, a sufficient current pulse $i_4$ (reverse with respect to diode 6) can be transmitted to destroy the junction of diode 6 as well; this converts the circuit to an effective short circuit. The total resistance of the circuit is then about 2 ohms, the value of the two diode resistances in series after they have been destroyed. Current $i_3$ is passed by closing switch 7 to the right; current $i_4$ is passed by closing switch 7 to the left. Battery 8 is connected as shown.

The mechanism of the destruction of the junction in the diode is called "thermal runaway." A diode having a known reverse breakdown voltage has a specific reverse power limitation. If this limitation is exceeded while current is flowing in the reverse direction, the diode junction is destroyed. Current in excess of the power limit increases the temperature of the device to such an extent that the heat is no longer dissipated or carried away. When this happens, the junction is destroyed.

For any device, the current requirement to destroy the junction can be calculated and/or ascertained by experiment. If the reverse breakdown voltage and power limitation of the device are known, the current required to destroy the junction can be calculated. In each diode, many factors affect this power limitation. For example, geometry of the device, its metallurgy, the package, the header, etc., all contribute to the heat removal.

When the junction is destroyed, there is no longer a barrier between P- and N-type regions. No longer is a substantial voltage required in order for charge carriers to cross the junction. The former energy gap appearing at the junction boundary is destroyed, leaving a disarray of particles in the lattice. Charge carriers are now provided with a stepwise, ladder-like path to surmount the energy gap. The reverse resistance previously provided by the gap has thus been substantially reduced.

The circuits shown in FIGS. 1 and 2 can be used as building blocks for more complex circuitry. For example, a fuse can be placed in series with the back-to-back diodes of FIG. 2; if a larger current is required to destroy this fuse than is required to destroy the diodes, the fuse will remain in the circuit after destruction of either or both. This circuit is initially non-conducting because of the back-to-back diode arrangement. Each diode is effectively an open circuit to current in one direction. After destruction of either or both diodes, making the circuit conductive in one or both directions, if a return to the non-conducting state is desired, a larger current pulse in either direction will burn out the fuse. Various other combinations can be achieved by connecting fuses and/or diodes in parallel with the circuits shown in FIGS. 1 and 2. The results can be varied according to whether the fuse or the diodes are destroyed by a lower current. Many other arrangements will be obvious to the skilled practitioner using the concepts of this invention.

Back-to-back diodes may be fabricated in an integrated circuit very simply using methods known in the art. For example, referring to FIG. 3, two regions 9 and 10 of one conductivity type (P-type in the illustration) are diffused into a wafer 11 of the opposite conductivity (N-type as shown). These conductivity types can be reversed as long as care is taken to provide the proper polarity pulse to destroy the desired diode. In this simplified schematic illustration, the curent pulse is provided by battery 12 and DPDT switch 13. When switch 13 is closed to the right, a current pulse goes through the region 10 (forward) through contact 14 and back region 9 (reverse) through contact 15. This pulse is therefore reverse with respect to the diode having region 9. Therefore the diode having region 9 is destroyed. To destroy the other diode instead, the switch is switched to the left, providing current in the reverse direction. After the diode having region 9 is destroyed, the effective circuit is represented in FIG. 4.

Another embodiment of the invention is shown in FIG. 5. Here two pair of back-to-back diodes are fabricated in the same wafer of semiconductor. Regions 16, 17, and 18 comprise one pair of back-to-back diodes; regions 19, 20, and 21 comprise the other. Region 22, of the opposite conductivity type from regions 16 and 20, effectively isolates the two pair of back-to-back diodes from each other. Resistors 23, 24, and 25 are included merely to illustrate possible loads which could be switched by the application of pulses to the diodes. In the illustration, these pulses are applied by battery 26 connected as shown in DPDT switch 27.

Figure 7:
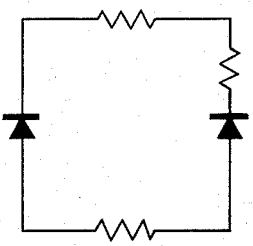
FIG. 7 is a schematic circuit of the device of FIG. 5 after the junctions of the other pair of diodes have been destroyed.

When switch 27 is closed to the left, the diodes having P regions 18 and 21 are destroyed. These diodes receive a reverse current pulse. The remaining effective circuit is shown in FIG. 6. If the current from battery 26 is reversed by switching switch 27 to the right, the diodes having P regions 17 and 19 are destroyed rather than the diodes having P regions 18 and 21. The remaining circuit in this latter case is shown in FIG. 7.

Figure 8:
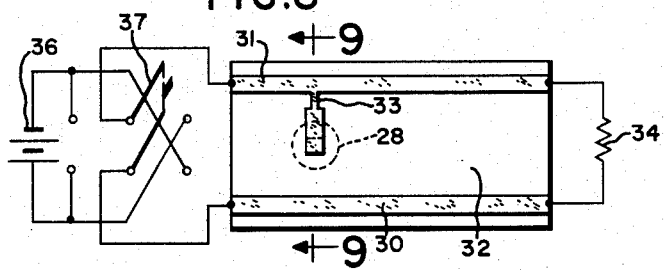
FIG. 8 is a somewhat schematic, greatly enlarged, illustration of another embodiment of the invention.
Figure 9:
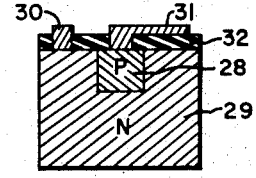
FIG. 9 is a transverse section taken along line 9—9 of FIG. 8.

FIGS. 8 and 9 illustrate an integrated circuit of the type shown in FIG. 1. A region of P-type conductivity is diffused into a wafer 29 of N-type conductivity. The contacts are metal strips 30 and 31 deposited over the oxide coating 32 on the surface of the semiconductor by methods well known in the art. For example, see U.S. Patent No. 2,981,877, assigned to the same assignee as this invention. Strip 30 is in contact with the N-type wafer 29. Strip 31 is in contact with the P-type region 28; it is separated and insulated from N-type wafer 29 by oxide layer 32. The thin portion of strip 31 is the fuse 33.

Figure 10:
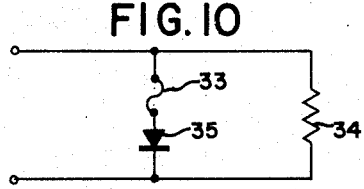
FIG. 10 is a schematic circuit diagram of the device of FIGS. 8 and 9.
Figure 11:
FIG. 11 is a schematic circuit diagram of the device of FIGS. 8 and 9 after the fuse has been burned out.

The effective circuit of FIGS. 8 and 9 is resistor 34 in parallel with diode 35 as shown in FIG. 10. Battery 36 shown in FIG. 8 is switched into the circuit in either direction by closing DPDT switch 37. If a circuit is required without the diode, switch 37 is closed to the right. This sends a forward current through the diode. If battery 36 is large enough, fuse 33 will burn out, leaving the circuit without a diode as shown in FIG. 11. However, once the fuse 33 has been burned out, the circuit can no longer be changed. If, on the other hand, switch 37 is switched to the left, a reverse current is sent through the diode. If this is sufficient to destroy the junction of the diode but not the fuse, then a short circuit remains across resistor 34. At a later time, this may be removed by a current through fuse 33 sufficient to burn it out.

Figure 12:
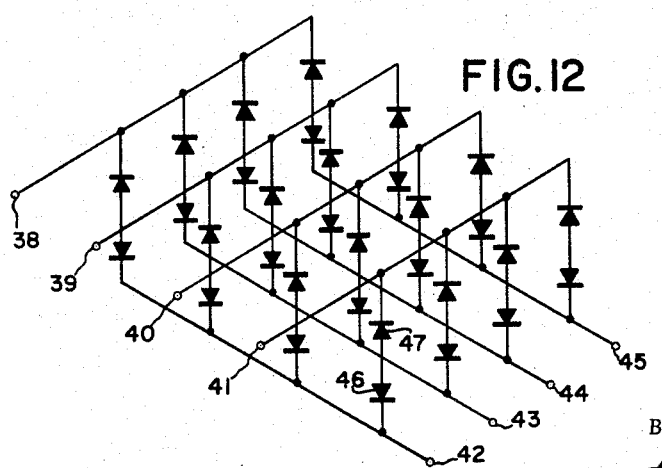
FIG. 12 is a diode matrix using the circuits of this invention.

A diode matrix using a plurality of the circuits shown in FIG. 2 is shown in FIG. 12. By proper pulses to contacts 38–45, this matrix can be adjusted to have a large variety of conductivity states. Referring specifically to one pair of back-to-back diodes 46 and 47, these initially form an open circuit. No current (except for small leakage currents) can flow through them. However, a sufficiently large reverse (with respect to diode 47) current pulse into electrode 42 destroys diode 47. Current then finds a short circuit from electrode 41 to electrode 42 (the forward direction of remaining diode 46) and an open circuit from electrode 42 to electrode 41 (the reverse direction with respect to remaining diode 46). If a reverse pulse (with respect to diode 46) is sent into electrode 41 rather than 42, diode 46 is destroyed; then the direction of the forward current in the circuit between electrodes 41 and 42 is reversed from the prior case. In the latter event, diode 47 remains in the circuit. If desired, a pulse can be sent through the diodes in both directions, leaving an effective short circuit between electrodes 41 and 42. Correspondingly, proper pulses are applied to all the other electrodes to achieve the desired final circuit matrix. The circuit shown in FIG. 12, therefore, provides a complex programmable diode array. Of course, the circuit may be made much larger, having hundreds or even thousands of terminals. A series of pulses sent into the proper electrodes converts a standard circuit into a programmed circuit. All of these diodes may be placed on the same wafer of semiconductor in the same manner as four diodes were so placed in FIG. 5.

As will be obvious to one skilled in the art, many modifications may be made in the invention as described above which are well within its spirit and scope. Therefore the only limitations to be placed on that scope are expressed in the following claims.

What is claimed is:

1. A programmable diode circuit which comprises a first semiconductor diode having two regions of opposite conductivity type, with a PN junction therebetween, said PN junction being capable of being permanently destroyed, leaving essentially a short circuit across its previous unidirectional current path in response to a current pulse of preselected magnitude in the reverse direction across said junction, connected in series with a second circuit element, said circuit being capable of permanently changing its state of conductivity from one state to another in response to a pulse through said circuit, and means for selectively permanently changing said state of conductivity of one of said circuit to non-conducting or to conducting in both directions.

2. Circuit of claim 1 wherein said second circuit element is a fuse.

3. Circuit of claim 1 wherein said second circuit element is a semiconductor diode having two regions of opposite conductivity type, with a PN junction therebetween, said PN junction being capable of being permanently destroyed, leaving essentially a short circuit across its previous unidirectional current path in response to a current pulse of preselected magnitude in the reverse direction across said junction, one of such regions being connected to the region of the same conductivity type of said first diode.

4. Circuit of claim 3 wherein said means for selectively changing the state of conductivity is a current pulse in the forward direction with respect to one of said diodes, which permanently destroys the PN junction of the other of said diodes so as to change the circuit from substantially non-conducting to substantially conducting in the forward direction of said one of said diodes.

5. Circuit of claim 3 wherein said means for selectively changing the state of conductivity is a current pulse in both directions which permanently destroys the PN junctions of both diodes so as to effectively change the state of conductivity of the circuit from substantially non-conducting to substantially conducting in both directions.

6. Two semiconductor diodes on one body of semiconductor material, each having two regions of opposite conductivity type, with a PN junction therebetween, said PN junction being capable of being permanently destroyed, leaving essentially a short circuit across its previous unidirectional current path in response to a current pulse of preselected magnitude in the reverse direction across said junction, with two of their respective regions of the same conductivity type connected, and means for selectively passing a reverse current through one of said diodes across its PN junction to permanently destroy said junction and to change the state of conductivity of said diode from substantially conducting only in the forward direction to substantially conducting in both directions, without affecting the state of conductivity of the other of said diodes.

7. Two semiconductor diodes on one body of semiconductor material, each having two regions of opposite conductivity type, with a PN junction therebetween, said PN junction being capable of being permanently destroyed, leaving essentially a short circuit across its previous unidirectional current path in response to a current pulse of preselected magnitude in the reverse direction across said junction, with two of their respective regions of the same conductivity type connected, and means for passing a reverse current through both of said diodes across their PN junctions to permanently destroy said junctions and to change the state of conductivity of said circuit from substantially non-conducting to substantially conducting in both directions.

8. A diode having two adjacent regions of opposite conductivity type with a PN junction therebetween, said PN junction being capable of being permanently destroyed, leaving essentially a short circuit across its previous unidirectional current path in response to a current pulse of preselected magnitude in the reverse direction across said junction, connected in series with a fuse, and means for selectively permanently destroying one of said fuse or said PN junction of said diode, said fuse, when destroyed, becoming substantially an open circuit, and said diode, when destroyed, becoming substantially a short circuit.

9. A plurality of pairs of semiconductor diodes each having two regions of opposite conductivity type with a PN junction therebetween, said PN junction being capable of being permanently destroyed, leaving essentially a short circuit across its previous unidirectional current path in response to a current pulse of preselected magnitude in the reverse direction across said junction, two of the regions of the same conductivity type of each pair being connected; and means for selectively passing a sufficient amount of current in one direction through at least one pair of said diodes to permanently destroy the PN junction of one diode of said pair, thereby converting said one pair of diodes from the substantially non-conducting state of conductivity to the substantially conducting state of conductivity only in the forward direction of the remaining diode in said one pair.

10. A plurality of pairs of semiconductor diodes of claim 9 all disposed in the same body of semiconductor material.

11. A circuit comprising a plurality of pairs of semiconductor diodes, each having two regions of opposite conductivity type, with a PN junction therebetween, said PN junction being capable of being permanently destroyed, leaving essentially a short circuit across its previous unidirectional current path in response to a current pulse of preselected magnitude in the reverse direction across said junction, two regions of the same conductivity type of each pair being connected; and means for programming said circuit by selectively passing the current pulse of said sufficient magnitude in one direction through at least one of said pairs of semiconductor diodes, thereby destroying the PN junction of one of the diodes of said pair to make it conductive in both directions, thus converting the state of conductivity of said pair of diodes from the substantially non-conducting state to the substantially conducting state in one direction.

12. The circuit of claim 11 wherein all of said diodes are disposed in the same body of semiconductor material.

13. A programmable diode circuit which comprises:

a first semiconductor diode having two adjacent regions of the opposite conductivity type with a PN junction therebetween, a second semiconductor diode having two adjacent regions of the opposite conductivity type with a PN junction therebetween, one of the two regions of said second diode being connected to the one of said two regions of the first diode of the same conductivity type, both said PN junctions being capable of being permanently destroyed, leaving essentially a short circuit across their previous unidirectional current path in response to a current pulse of preselected magnitude in the reverse direction across either of the junctions, and means for passing a current through said circuit of said sufficient magnitude to selectively destroy the junction of one of said two diodes, thereby essentially converting said diode having a destroyed junction to a short circuit.

14. A programmable circuit matrix having a plurality of input and output terminals, each input terminal connected to each output terminal through a different pair of back-to-back semiconductor diodes, each of said diodes having two adjacent regions of the opposite conductivity type with a PN junction therebetween, said PN junction being capable of being permanently destroyed, leaving essentially a short circuit across its previous unidirectional current path in response to a current pulse of preselected magnitude in the reverse direction across said junction, one of the regions of one diode of each pair being connected to the region of the other diode of said pair of the same conductivity type.

References Cited by the Examiner
UNITED STATES PATENTS

| | | | |
|---|---|---|---|
| 2,784,389 | 3/57 | Kelly | 340—152 XR |
| 2,961,593 | 11/60 | Kozacka | 327—14 |
| 2,972,096 | 2/61 | Johnson | 200—113 |
| 3,028,659 | 4/62 | Chow et al. | 340—166 |
| 3,040,191 | 6/62 | Bright | 317—234 XR |
| 3,098,160 | 7/63 | Noyce | 307—88.5 |

NEIL C. READ, *Primary Examiner.*